Dec. 22, 1953  D. G. SOUSSLOFF  2,663,507
WINDING MACHINE
Filed Jan. 12, 1949  9 Sheets-Sheet 1

INVENTOR.
Dimitri G. Soussloff
BY
Watson, Cole, Grindle & Watson
ATTORNEYS.

INVENTOR:
Dimitri G. Soussloff
BY
Watson, Cole, Grindle & Watson
ATTORNEYS.

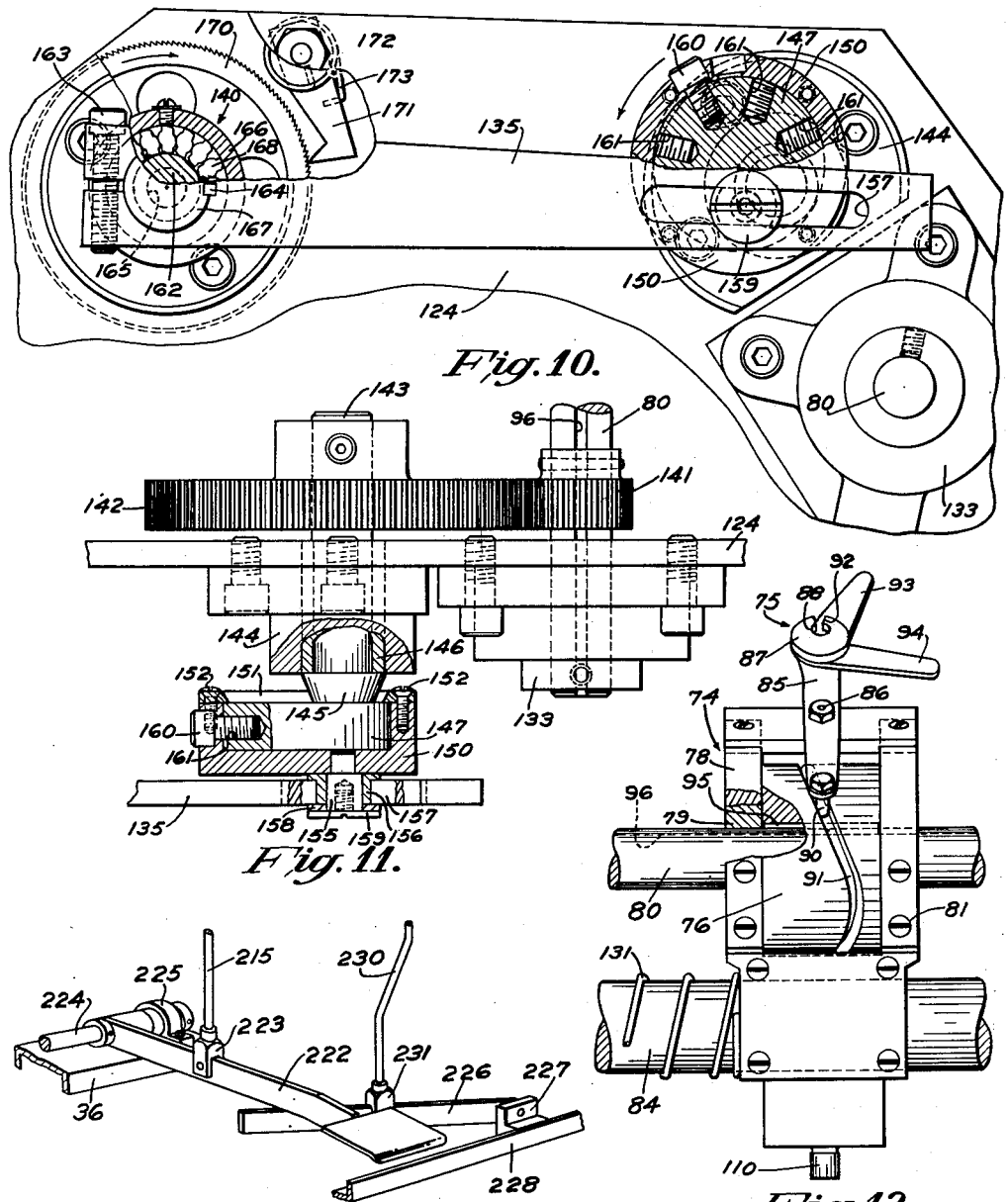

Patented Dec. 22, 1953

2,663,507

UNITED STATES PATENT OFFICE 2,663,507

WINDING MACHINE

Dimitri G. Soussloff, Warwick, R. I., assignor to Universal Winding Company, Boston, Mass., a corporation of Massachusetts Application January 12, 1949, Serial No. 70,463

29 Claims. (Cl. 242—18)

This invention relates to machines for winding attenuated strand materials such as yarn, thread and the like into cops or packages for use in further transfer operations.

In the following specification and claims the term "yarn" is used in a general sense to indicate any and all types of strand materials and the term "package" is employed to designate any form or shape of the wound mass.

One object of the invention is to provide an automatic machine particularly adapted for winding synthetic yarns such as nylon, rayon or glass fiber delivering directly from a spinneret or other issuing means without imparting any twist to the yarn.

Another object is to provide an automatic machine for winding the yarn at high speed with a continuous take-up as the strand material is delivered continuously from its source of supply such as a spinneret or other issuing means without interruption in its delivery.

Another object is to provide means for winding a plurality of packages successively first one and then another without interruption in the delivery of the yarn while providing for the doffing of each completed package during the winding on another package without interrupting the delivery of the yarn as the winding is transferred from one package to another.

Another object is to provide an automatic winding machine for winding the yarn continuously to produce a plurality of packages, one after another in sequence, with transfer of the yarn from one package to another accomplished without stopping the flow of the yarn from the spinneret or other issuing means.

Another object is to provide an automatic machine with means for winding a plurality of packages arranged in coaxial relationship with the winding performed first on one package and then on another package and the sequence continued without interrupting the feed of the yarn.

Another object is to provide a machine for winding a plurality of packages arranged in coaxial alinement with the winding operation transferred back and forth from one package to another upon the completion of each package without interruption in the delivery of the yarn.

Another object is to provide a winding machine of the type indicated having means for winding a plurality of packages in sequence with automatic means for arresting winding on one package, transferring the yarn to and winding it on another package, and automatically displacing the completed package into convenient position for doffing while the winding continues on the next package in the series.

Another object is to provide a machine of the type indicated having means for traversing the yarn in the manner of a filling wind, starting at one end of the package and finishing at its opposite end and then automatically shifting the traversing means to start the winding on the next package during the doffing of the first-wound package.

Further objects of the invention are set forth in the following specification which describes a preferred form of construction of the winding machine, by way of example, as illustrated by the accompanying drawings.

In the drawings:

Fig. 10 is an enlarged view of the one-way clutch which drives the feed-cams and also illustrating the means for adjusting the range of action of the driving means for the clutch;

Fig. 11 is a plan view of a portion of the last-described mechanism showing the driving means for the eccentric which operates to rotate the one-way clutch;

Fig. 12 is an enlarged detailed view of the yarn-guide and cam for oscillating said guide with their mountings;

Fig. 13 is a perspective view showing the foot-levers for operating the lock which holds each spindle-carrying arm with its winding spindle in operative relationship;

Figure 2:
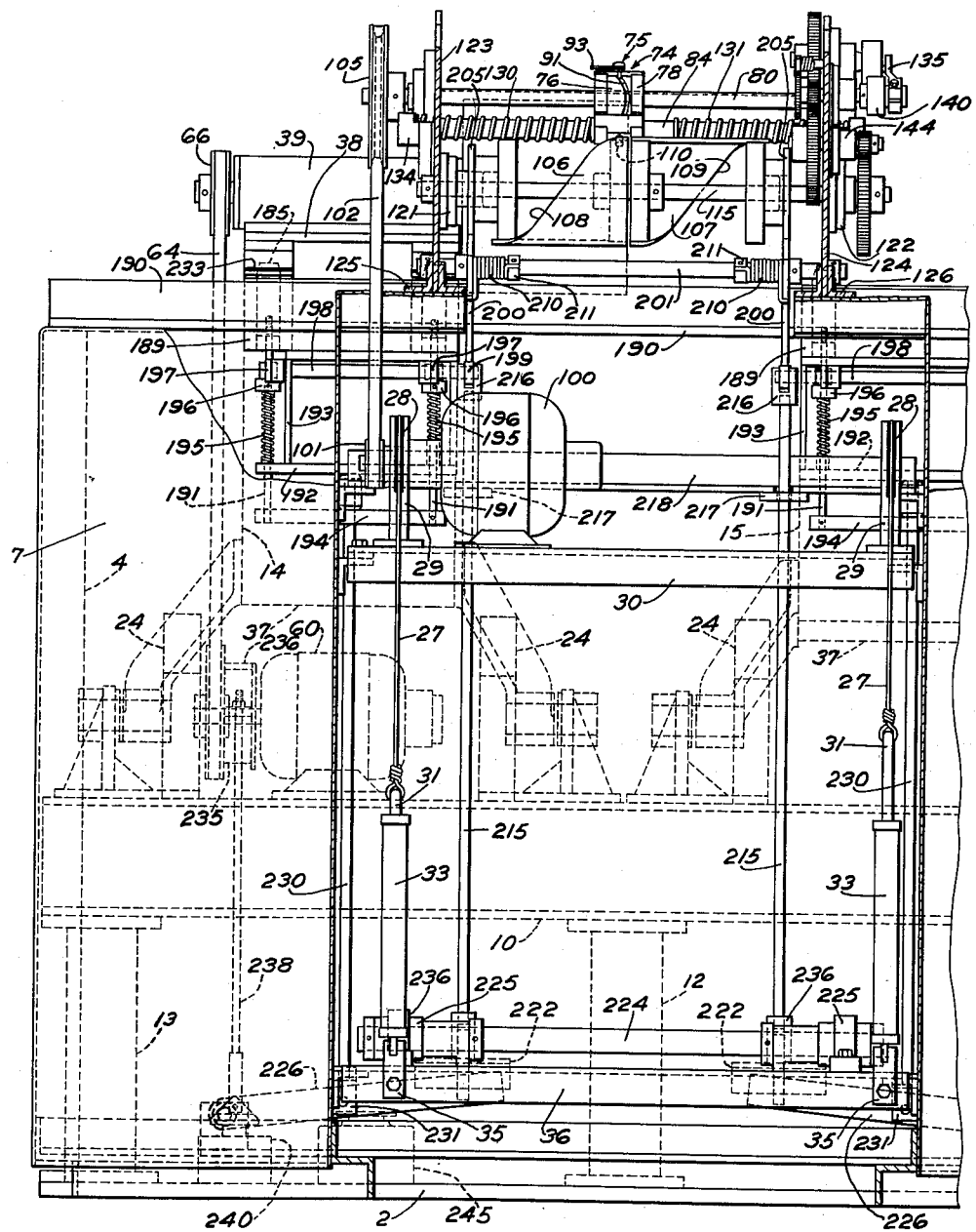
Fig. 2 is a rearward elevational view of a major portion of the present winding machine in enlarged scale showing the traversing means for the yarn and the means for shifting the traverse from one package to another for the continuous winding of a series of packages.
Figures 3, 4:
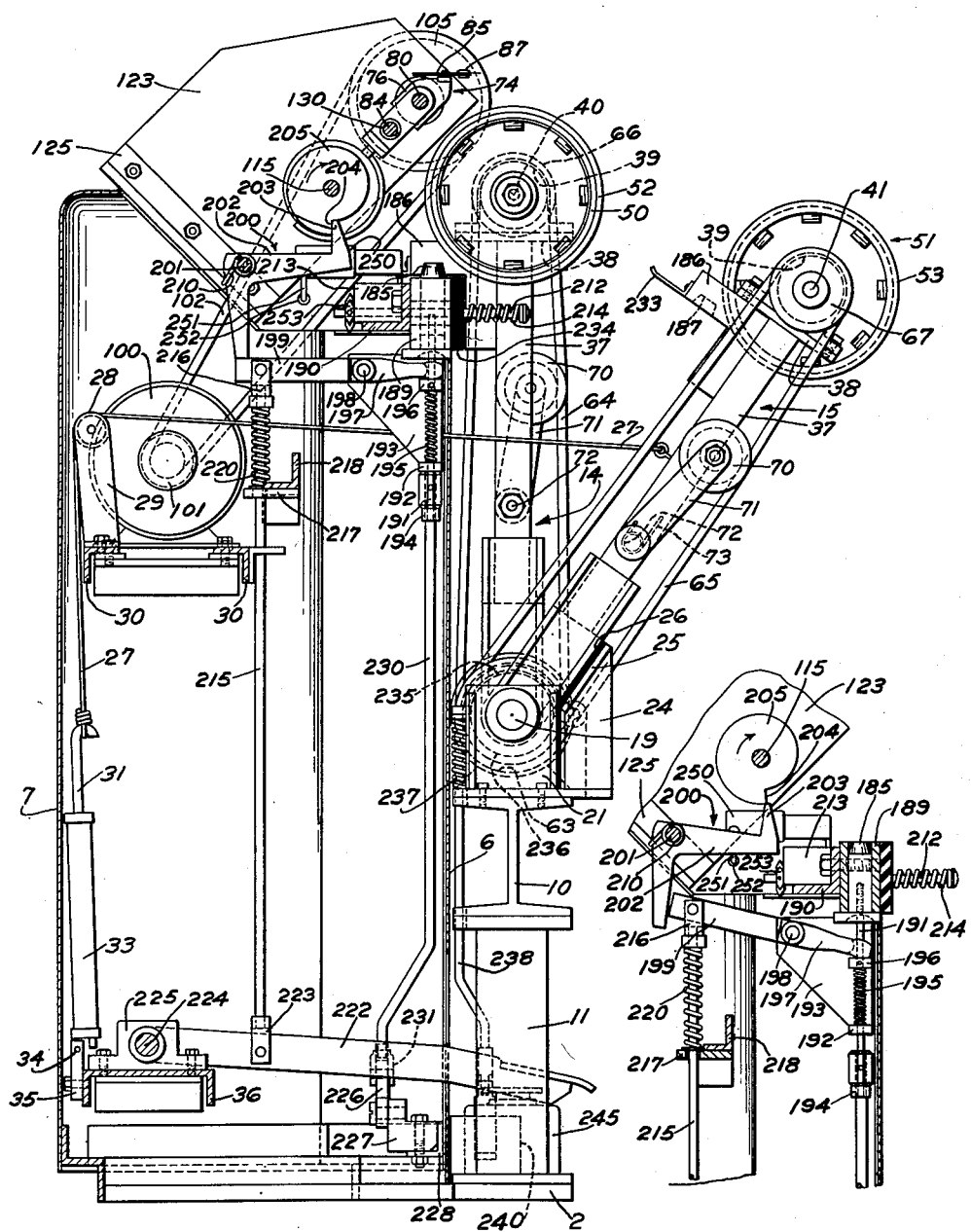
Fig. 3 is an enlarged transverse sectional view of the machine on line 3—3 of Fig. 1 illustrating the arrangement of the supporting arms for the winding spindles which are adapted to swing outwardly at the front of the machine for doffing the wound packages from the holders on the spindles.
Fig. 4 is a detailed view of the locking means for holding the spindle-supporting arms with the spindles in operating relationship for winding and showing the locking means for one of the winding spindles released after the completed package has been swung out into doffing position.

In general, the present winding machine is constructed with a main framework or casing comprising a base 2, see Fig. 1, with uprights 3 and 4 at either end thereof for supporting the various units of the machine mounted on cross-members to be later described. The casing of the machine may be constructed of sheet-metal comprising a forward vertical wall 6 and a rearward wall 7, see Figs. 2 and 3. A cross-member, preferably in the form of an I-beam 10, extends laterally across the front of the machine supported on three cylindrical columns 11, 12 and 13 rising from the base 2. The cross-member 10 serves as a mounting for the yoke-shaped arms 14 and 15 which carry bearings for the winding spindles, to be later described. The opposite inclined legs of the yokes or lower forks of the arms 14 and 15 are provided with hubs 16 and 17, respectively, mounted on pivot-studs 18 and 19 projecting from brackets 20 and 21 secured to the upper flange of the cross-member or I-beam 10. By means of this pivotal mounting for each of the arms 14 and 15 they may be swung outwardly individually as shown in Fig. 3 to displace one or the other winding spindle toward the front of the machine in convenient position for doffing the wound package therefrom. The outward swinging movement of the arms 14 and 15 is limited by stops in the form of brackets 24 fastened to the flange of the cross-member 10 and having inclined shelf-portions 25, see Fig. 3, to which may be attached rubber pads or buffers 26 for relieving the shock when the arms swing outwardly under the force of gravity. As a further means for controlling the gravitational swinging movement of the arms 14 and 15 each arm may have attached thereto a cord or wire cable 27, see Fig. 3, passing over a grooved pulley 28 journaled on a bracket 29 that is mounted on angle-iron cross-members 30 of the frame of the machine. The end of the cord or cable 27 is attached to a hook at the end of a plunger 31 which operates a piston slidable in a cylinder 33, the arrangement being similar to a door-stop. The cylinder 33 is pivotally mounted at 34 on a member 35 bolted to the flange of a channel-iron strut 36 which extends across the frame of the machine. The arrangement of the plunger 31 and cylinder 33 is not described herein in detail as it is of conventional construction. Suffice it to state that the plunger 31 may be operated pneumatically to resist its withdrawal from the cylinder 33 to thereby check the outward swinging movement of its connected arm 14 or 15 so as to eliminate shock and jar on the parts carried by the arms.

Figure 1:
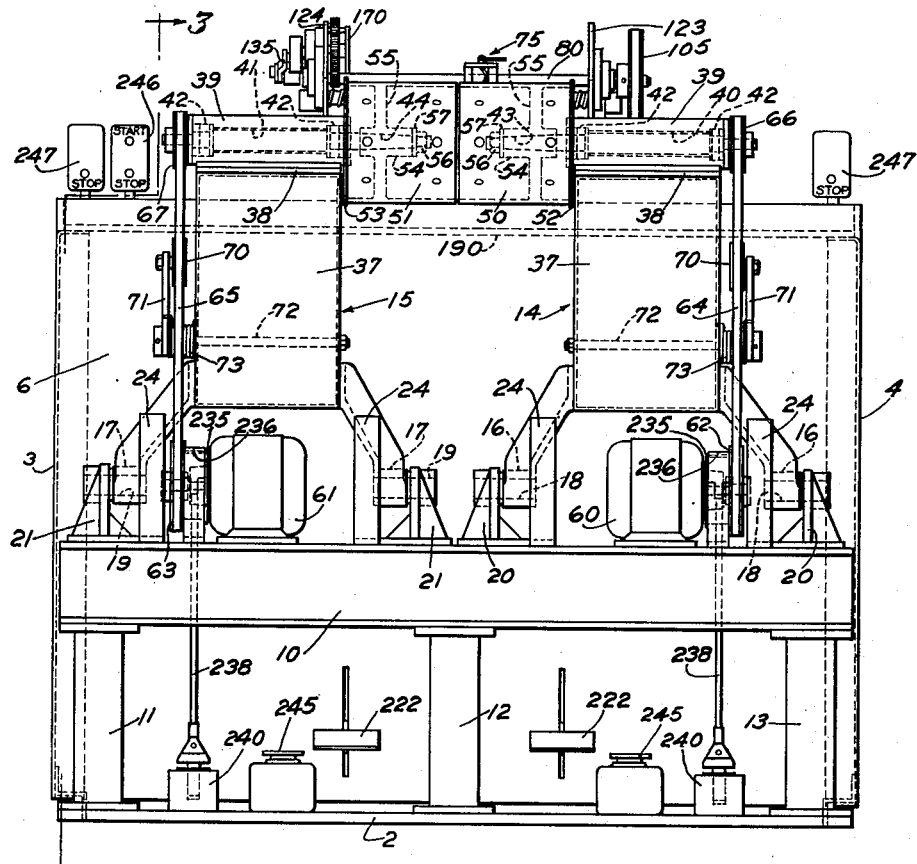
Fig. 1 is a front elevational view of the present improved winding machine illustrating the co-axial arrangement of the winding spindles that carry drums or holders for the tubular shells on which the packages are wound and showing the independent driving means for the separate spindles.

Rising from the forks of the arms 14 and 15 are hollow box-like sheet-metal members 37, see Figs. 1 and 3, surmounted by cross-members 38 on which are mounted bearing brackets 39 for the winding spindles 40 and 41, shown by dotted lines in Fig. 1. As the bearings for both winding spindles are of identical construction it will be sufficient to describe only one of them. Each bearing bracket 39 is of hollow cylindrical form and counterbored at its opposite ends to receive the outer races 42 of ball-bearings of usual construction. Each spindle 40 or 41 carries inner races between which and the outer races 42 the balls rotate, thus providing antifriction bearings for high speed rotation of the spindles and their package-holders. The spindle 40 has a tapered extension 43 projecting from its left-hand end, as viewed in Fig. 1, and the opposite spindle 41 has its counterpart in the tapered extension 44 with the package-holders 50 and 51 fixedly mounted thereon, respectively, in coaxial end-to-end relationship. The package-holders 50 and 51 are adapted to receive tubes or shells T rotated thereby for supporting the yarn windings. Each package-holder 50 or 51 is in the form of a cylinder having a flange 52 or 53 at its end, and being supported from the spindles 40 or 41 by means of a hub 54 and disks 55. The package-holders 50 and 51 may be secured in place on the tapered portions 43 and 44 of the spindles 40 and 41 by means of nuts 56 set up against washers 57. Suitable means, not herein shown or described in detail, may be provided for securing the tubes T in place on the holders 50 and 51.

The winding spindles 40 and 41 are driven independently from electric motors 60 and 61, respectively, that are mounted on the flange of the cross-member 10. The motors 60 and 61 are provided with pulleys 62 and 63 on their armature shafts connected by belts 64 and 65 to pulleys 66 and 67 on the ends of the spindles 40 and 41, respectively. As shown most clearly in Fig. 3, flanged idler-pulleys 70 carried by arms 71 pivotally mounted on rods 72 in the arms 14 and 15 are arranged to engage against one length of each belt 64 or 65. A coiled spring 73 coiled about the rod 72 tends to swing each arm 71 outwardly to maintain pressure of its idler-pulley 70 against the belt to keep it taut. It thus will be observed that the two winding spindles 40 and 41 are driven independently from their respective motors 60 and 61 with the drive controlled automatically to selectively start and stop the rotation of each winding package by means later described.

The traversing means for the yarn, shown most clearly in Figs. 5, 6, 7 and 12, is of novel construction comprising an oscillating strand-guide 75 which partakes of several different motions; first, it is oscillated with a relatively short throw as compared to the length of the package being wound; secondly, it is fed longitudinally of the axis of the package from one end to the other to deposit the yarn in short layers advancing as in a weft-wind; thirdly, it is shifted rapidly from the outermost end of a completed package back toward the starting end of the next package to be wound; and meanwhile the oscillation of the strand-guide is continued and it is fed longitudinally of the next alternately wound package; all as explained more fully hereinafter. The strand-guide 75 is mounted on a carriage or crosshead 74 which also carries a cam 76 for oscillating the guide as shown most clearly in Figs. 3 and 12. The carriage or crosshead 74 may take the form of a two-part rectangular frame 78 constructed in the form of a saddle or fork which straddles a drive-shaft 80 and is provided with bearings 79 for slidably mounting it thereon. The parts of the crosshead 74 are fastened together with screws, shown at 81 in Fig. 12, with the side portions of the crosshead abutting the ends of the cam 76 to adapt it to rotate therebetween. The main body of the crosshead 74 is continued downwardly to straddle a guide-rod 84 and is provided with bearings for said rod slidable thereon to prevent the carriage from turning on the drive-shaft 80.

The strand-guide 75 is in the form of an arm or lever 85 pivoted to rock on a stud 86 fast in the upper cross-member of the crossheads 74. At its upper end the lever 85 carries a button 87 formed with an eye 88 through which the winding strand feeds, while at its lower end is a stud 90 which engages in a helical groove 91 in the cam 76. Through this latter connection rotation of the cam 76 imparts a relatively short oscillating movement to the guide-arm or lever 85 to traverse the strand feeding through the eye 88 in the guide-button 87. A slot 92 leading from the edge of the guide-button 87 into its central opening 88 provides means for threading the strand thereinto and a pair of rockable fingers 93 and 94 serve as re-entrant guiding means for directing the yarn through the slot 92 and into the opening 88 in the button. The two fingers 93 and 94 are integral, projecting from a central portion with their opposite edges forming a V at substantially 90° inclination, the arms being mounted to swivel about the center of the guide-button 87. After the yarn has been entered through the slot 92 into the eye 88 the fingers 93 and 94 may be rotated to position one of them to close the slot 92 leading to the guide-eye 88 and prevent escape of the yarn from the eye.

Referring particularly to Fig. 12, the cam 76 is secured rotatively with the drive-shaft 80 by a key 95 adapted to slide in a spline 96 extending substantially the full length of the shaft. Consequently, the cam 76 will be driven from the shaft 80 constantly during its sliding movement longitudinally thereof. The drive-shaft 80 is rotated continuously from its individual motor 100, see Figs. 2 and 3, by means of a pulley 101 on the armature shaft of the motor connected by a belt 102 to a pulley 105 fast on the end of the drive-shaft. The motor 100 is supported from the pair of angle-irons 30, previously mentioned.

Figure 5:
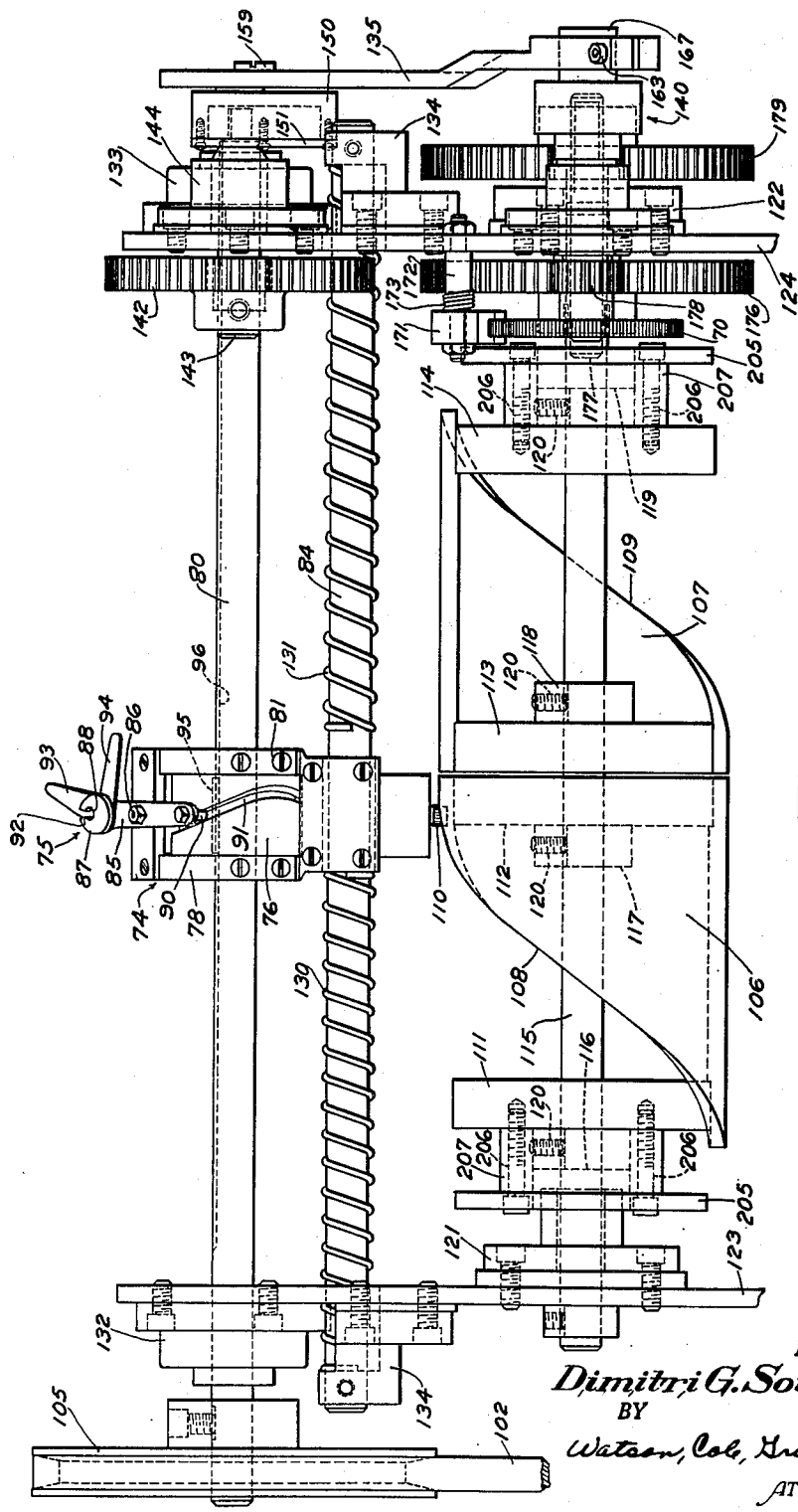
Fig. 5 is an enlarged plan view of the yarn-traversing means, the operating means therefor, and the means for shifting the traversing means to transfer it from one spindle to another for continuing the winding of different packages in sequence.
Figure 7:
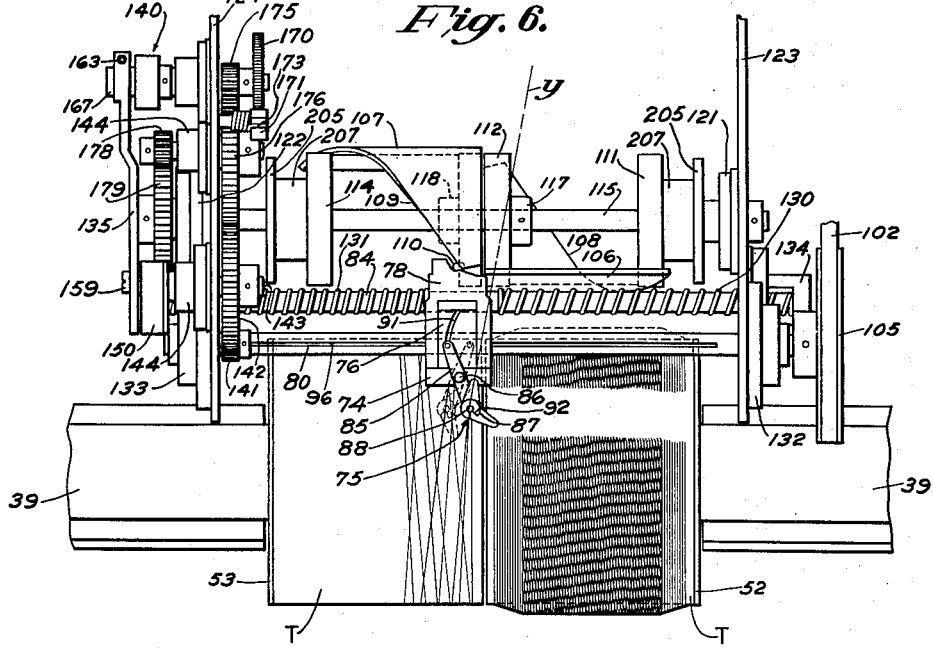
Fig. 7 is a similar view showing the yarn-traversing means as shifted to commence the winding of a second package and illustrating the manner in which the yarn strand starts to wind on the holder for the second package.

The means for feeding the traversing means lengthwise of the package and eventually shifting the crosshead 74 in the reverse direction to transfer it into operative relationship to start the winding of the next alternately produced package comprises a pair of semi-cylindrical cams 106 and 107 having helical cam-faces 108 and 109 which are engageable by a bowl or roller 110 projecting downwardly and rearwardly from the crosshead, see Fig. 5. The two cams 106 and 107 are of opposite hand with their helical faces 108 and 109 of the same pitch, each extending through 180° of a circumference. The semi-cylindrical portions of the cams 108 and 109 are supported on end disks 111, 112, 113 and 114 mounted fast on a drive-shaft 115. The cam 106 is carried on the shaft 115 by means of hubs 116 and 117 on the disks 111 and 112 and the opposite cam 107 is similarly mounted on the same shaft by hubs 118 and 119 on the disks 113 and 114 with set-screws 120 for keying them rotatively with the shaft. The shaft 115 is journaled at its opposite ends in bearings 121 and 122 fastened to vertical side plates 123 and 124 supported from the framework of the machine by means of angle-iron brackets 125 and 126 bolted thereto, see Figs. 2, 3 and 5. The shaft 115 is driven at a relatively slow rate of speed by means of gearing, later described, to cause each cam 106 or 107 to feed the crosshead 74 longitudinally of one or the other winding spindle 40 or 41 as the strand-guide 75 traverses the yarn in short strokes advancing from one end of the package-holder to its opposite end. At the completion of one-half revolution of each cam the roller 110 will ride off from the end of its helical face, at this juncture a package being completed, and the crosshead 74 will be shifted laterally back from one cam for operation by the opposite cam to commence the winding of another package. This shifting or transfer of the carriage 74 from one cam to the other is accomplished very rapidly by the force of a spring 130 or 131, each respective spring being compressed to load or energize it as the crosshead is fed in the first direction by one of the cams. The force of each spring augmented by momentum is sufficient to slide the crosshead 74 some distance beyond its starting point on the opposite cam, its sliding motion being eventually checked by the compression of the opposite spring acting as a buffer. As this latter spring recoils it will return the crosshead 74 to the inner end of the package-holder at the starting point for winding the next succeeding package as indicated in Fig. 7 of the drawings and more particularly explained hereinafter. Thus, it will be observed that each package is completed as the roller 110 on the crosshead 74 reaches the end of the helical face of the respective feed-cam 106 or 107, its release from the cam being automatically effected after a half revolution thereof.

It should be explained that the drive-shaft 80 for the cam 76 which oscillates the strand-guide 75 is journaled in bearings 132 and 133 at opposite sides of the machine framework, these bearings being supported on the plates 123 and 124 previously mentioned. Likewise, the rod 84 around which the springs 130 and 131 are coiled is mounted at its ends in bearings 134 fastened to the plates 123 and 124. It has been explained that the drive-shaft 80 for the traversing means is driven continuously from its own motor 100 and that it forms the main drive for the machine. The drive is communicated from the shaft 80 to the cam-shaft 115 at an exceedingly slow rate of speed through mechanism as next explained; for example, the speed-ratio between the drive-shaft 80 and cam-shaft 115 may be substantially 12,000 to 1. This reduction in speed may be accomplished by means of a spur-gear train and an eccentrically-operated lever 135 for advancing a ratchet or, as herein illustrated, a one-way clutch 140 shown in Figs. 10 and 11.

Figure 8:
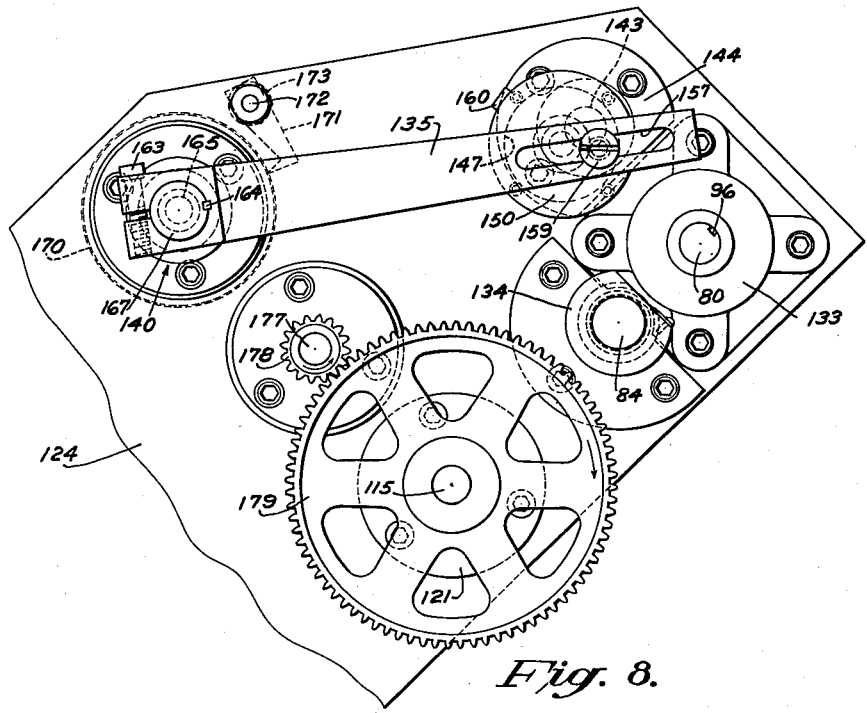
Fig. 8 is an enlarged elevational view showing the driving means for advancing the one-way clutch which rotates the drive-shaft of the two cams for feeding the traversing means axially of the winding spindles.
Figure 9:
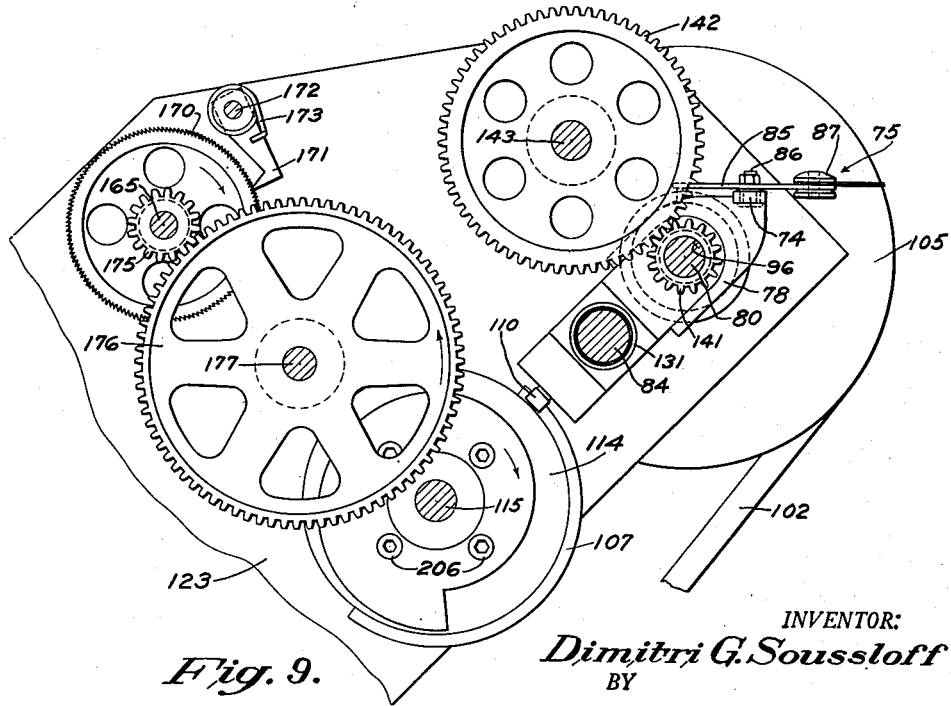
Fig. 9 is a similar view showing certain elements of the gear-train which drives the cams for feeding the yarn-traversing means.

Referring to Figs. 8, 9, 10 and 11, the drive-shaft 80 carries fast thereon a spur-gear 141 in mesh with a larger gear 142, see Fig. 9, which is fast on a stub-shaft 143 held in a bearing 144 secured to the side plate 124 as shown in Figs. 8 and 11. The shaft 143 is formed at its end with a conical projection 145 providing a shoulder abutting the end of a bushing 146 in the bearing 144 in which the shaft is journaled. Formed on, or attached to, this end of the stub-shaft 143 is a disk-like eccentric 147 carrying a cup-shaped collar 150 enclosing its periphery and held in place by a ring 151 at its rear fastened to the collar 150 by screws 152 and overlying the rearward face of the eccentric. Projecting from the forward face of the collar 150 is a crank-pin 155 carrying a friction-reducing bushing 156 which engages in a slot 157 at one end of the clutch-operating lever 135, previously referred to. A washer 158 on the crank-pin 155 abuts the end of the bushing 156 and is held in place by the head of a screw 159; this connection between the lever 135 and the eccentric 147 permitting sliding motion of the crank-pin 155 in the slot 157 during the oscillation of the lever by the rotation of the eccentric. The degree of eccentricity of the crank-pin 155 may be regulated by rotating the collar 150 on the eccentric 147 to adjust the crank-pin 155 to a greater or lesser radial distance from the axis of rotation of the eccentric with the shaft 143. The collar 150 may be held in its adjusted position by means of a stud or bolt 160 inserted in one of several threaded holes 161 spaced around the periphery of the eccentric 147 as shown in Fig. 10.

The opposite end of the lever 135 is fixedly connected to the hub 167 of the one-way clutch 140, being bored to receive the hub 167 and split at its end with a binder-screw 163 for clamping the lever thereto. The hub 167 may also be keyed to the lever 135 at 164. The one-way clutch 140 may be of any usual construction; for example, as comprising an inner sleeve 162 fast on a shaft 165. The hub 167 is formed with an integral flange supporting a cylindrical housing 166, see Fig. 10, which surrounds the periphery of the sleeve 162. Between the sleeve 162 and the interior of the housing 166 are a series of pawl-like elements or "sprags" 168 which engage with the inner rim of the housing to frictionally rotate it from the sleeve 162 in one direction only as indicated by the arrow in Fig. 10. A ratchet-wheel 170 fast on the shaft 165, see Fig. 9, is arranged with its teeth adapted to be engaged by the pointed toe of a pawl 171 pivoted on a stud 172 and actuated by a spring 173 to prevent reverse rotation of the sleeve 162 and shaft 165. As the one-way clutch 140 is of conventional design and construction it is not further described herein.

Referring now particularly to Figs. 8 and 9, the clutch-element 140 turns the shaft 165 which carries a pinion gear 175 meshing with a larger spur gear 176, see Fig. 9. The gear 176 is fast on a shaft 177 which also has fast thereon a pinion 178, see Fig. 8, meshing with a larger gear 179. The gear 179 is fast on the end of the shaft 115 which carries the feed-cams 106 and 107 and through the connections described above the cams are driven at a relatively slow rate of speed from the one-way clutch 140 rotated by the oscillation of the lever 135.

The swinging arms 14 and 15 which mount the bearings for the winding spindles 40 and 41 are adapted to be locked with their spindles in winding position by pairs of latch-bolts 185, shown most clearly in Figs. 3 and 4. As the construction and arrangement of the latching means are the same for both arms it will be sufficient to describe only one of them; for example, in connection with the arm 15. Referring to Figs. 2 and 3, the arm 15 has two lateral projections 186 adjacent its upper end formed with V-shaped notches 187 adapted to be engaged by the tapered ends of a pair of latch-bolts 185. The two latch-bolts 185, see Fig. 3, are slidable vertically in a bearing-block 189 fastened to the forward side of an angle-iron cross-member 190 which extends between the end members 3 and 4 of the machine casing. Connected to the two latch-bolts 185 and extending downwardly therefrom are two rods 191 mounted to slide in bearings in the lower cross-member 192 of a rectangular-shaped bracket 193, see Fig. 2, fastened to the block 189. The lower ends of the rods 191 are connected by a crossbar 194. Helical springs 195 on the rods 191 are held under compression between the cross-member 192 and collars 196 fast on the rods and tend to slide the rods and the bolts 185 upwardly to engage their tapered ends with the notches 187 in the projections 186 on the spindle-carrying arms 14 and 15; it being noted that the bolts 185 operate to lock the arms 14 and 15 with their spindles 40 and 41 in winding position although one bolt shown in Fig. 3 is illustrated as disengaged from the arm 15 since this arm is shown as swung outwardly. The latch-bolts 185 are adapted to be operated automatically to release either arm 14 or 15 upon the completion of the package being wound on the package-holder of its respective spindle through a train of mechanism shown in Figs. 2, 3 and 4 and next described.

A pair of levers 197 are fastened to a rockable shaft 198 rotatable in bearings in the uprights of the bracket 193. The levers 197 are formed with forks at their forward ends straddling the rods 191 with the sides of the forks of convex shape on their edges to adapt them to act against the collars 196 on the rods to force the latter downwardly and withdraw the latch-bolts 185 from the notches 187, see Fig. 4. The levers 197 of each pair are normally held in the position shown in Fig. 3 by the engagement of the vertical arm of an elbow-shaped detent-lever 200 with the rearward end of a lever 199 fast on the inner end of the rod 198 beyond the levers 197. The lever 200 is pivoted on a rod 201 and has its horizontal arm 202 terminating in a pointed toe 203 adapted to ride on the periphery of an eccentrically-shaped cam 205 formed with a radial shoulder 204. It will be understood that two cams 205 are provided fast on the opposite ends of the shaft 115 which carries the two feed-cams 106 and 107; that is, one cam for cooperation with each pair of latch-bolts, see Fig. 5. As shown in this latter view the cams 205 are attached to the disks 111 and 114 at the outer ends of the cams 106 and 107 by means of bolts 206 passing through spacer-tubes 207 between the sides of the disks and the sides of the cams.

Referring to Figs. 3 and 4, the cams 205 rotate in a clockwise direction as indicated by the arrows in these views during the rotation of the shaft 115 which drives the feed-cams 106 and 107. As shown in Fig. 2, two helical springs 210 coiled around the rod 201 are held at one end by collars 211 fast on the rod with their opposite ends engaging the levers 200 to maintain their toes 203 bearing against the peripheries of the respective cams 205. The cams 205 are so angularly related to the feed cams 106 and 107 that after each of the latter has been turned through one-half of a complete revolution or 180° the eccentric portion of the cam 205 will rock the detent-lever 200 sufficiently to release its vertical arm from the end of the lever 199 so that the latter may be allowed to rock to withdraw the latch-bolts 185 from engagement with the notches 187 in the projections 186 on the arm 14 or 15.

After the release of the latch-bolts 185 from either arm 14 or 15 the outward movement of the arm is initiated by means of a plunger rod 212 which is slidable in a bearing 213 mounted on the angle-iron cross-member 190 and provided with a convex button at its end. A helical spring 214 is coiled around the rod 212 between its end button and the angle-iron 190, thereby tending to project the rod towards the right as shown in Figs. 3 and 4 to force the button against the arm 14 or 15, as the case may be, and swing the arm outwardly about its pivot. It will be understood that after the arm has been initially propelled outwardly beyond its vertical position it is influenced by gravity to cause it to swing downwardly until it swings up against the buffer pad 26 on the bracket 24, see Fig. 3.

The lever 199 has connected to its rearward end a rod 215 by means of a clevis 216. The rod 215 is slidable in a bearing 217 supported from an angle-iron cross-member 218, and between this bearing and the clevis 216 is a helical spring 220 normally tending to rock the rearward end of the lever 199 upwardly and depress its forward end to withdraw the latch-bolts 185 from the notches 187 for releasing the arm 14 or 15, as the case may be. It is to be noted that the spring 220 is of heavier wire and greater strength than that of the two springs 195 on the rods 191 connected to the bolts 185 so that it normally tends to rock the lever 199 to withdraw the bolts; but when the detent-lever 200 is in the position shown in Fig. 3, that is, before its toe 203 has been forced downwardly by the eccentric 205, the stronger spring 220 is maintained under tension by the engagement of the vertical arm of the lever 200 with the end of the lever 199 to restrain the latter from rocking upwardly.

The rod 215 is connected to a foot-lever 222 by means of a clevis 223, see Fig. 3, the foot-lever being pivoted on a rod 224 held in bearings 225 which are supported on the channel beam 36 extending laterally across the bottom of the framework, see also Fig. 2. The foot-lever 222 may be operated manually to draw the rod 215 downwardly and rock the lever 199 to release the levers 197 from the collars 196 and thereby permit the springs 195 to slide the bolts 185 upwardly and engage their ends with the notches 187 to lock either arm 14 or 15 in position for winding on the package-holder of its respective spindle.

The foot-lever 222 is further adapted to engage and rock another lever 226 extending at right-angles thereto therebelow as shown most graphically in the perspective view, Fig. 13 of the drawings. The lever 226 is pivotally mounted on a bearing 227 supported by a horizontal angle-iron rail 228 at the bottom of the machine casing. A rod 230 fastened to the crossbar 194 which connects the two rods 191 has its lower end connected to the lever 226 by means of a clevis 231. Through the cooperation of the lever 222 with the lever 226 the rod 230 may be drawn downwardly to depress the crossbar 194 and thereby move the rods 191 downwardly to withdraw the latch-bolts 185 from engagement with the notches 187 in the arm 14 or 15, as the case may be. In this way the latching means for the different arms 14 and 15 may be manually released to allow either arm to swing outwardly for doffing the package should the winding strand be broken or for any other cause, all as later more fully explained in connection with the method of operation of the complete machine. The arms 14 and 15 may be swung back manually to return the winding spindles to winding position and are locked in this position automatically by the bolts 185. For this purpose each arm is provided at its upper end with a projecting plate 233 adapted to slide across the ends of the bolts 185 to force them downwardly against the pressure of the springs 195, whereafter they may be projected upwardly to engage in the notches 187.

It has been explained that each of the winding spindles 40 and 41 is driven independently by its respective motor 60 or 61 and the two motors are controlled individually by interrupting the current to arrest the rotation of the winding spindle driven thereby. For this purpose the current is supplied to each motor through a separate circuit including a magnetic motor-starter, magnetic contactor, resistors, and other electrical devices indicated in the diagrammatic views, Fig. 15 which relates to one method of control; and in Fig. 16 as to an alternative method. To insure prompt stopping a brake is preferably employed with each motor 60 and 61 for automatic application when either of the spindles is thrown out of winding position. Referring to Figs. 1 and 3, a usual type of band-brake 235 is arranged to engage a drum 236 on the motor armature shaft with a spring 237 normally tending to hold the brake released. The spring 237 is coiled about a rod 238 which reaches downwardly and is connected to the armature of a solenoid indicated generally at 240 in Figs. 1 and 3. The solenoid 240 is energized as the current to the motor is interrupted through means in the circuit shown in the diagram Fig. 15 and later explained.

It is desirable in most instances to start the rotation of the winding spindles slowly so as not to break the strand of yarn or other material feeding to the package-holder at the start of the winding operation. That is to say, since in winding such material as glass fiber, rayon and the like, the strand is relatively fine and delicate and liable to be broken if the spindle is started at the high rate of speed normal to the continuous operation of the machine. Therefore, the present invention provides a slow-speed starting device for each motor 60 or 61 comprising manually-operable switches, such as the foot-switches indicated at 245 in Fig. 1, connected in circuit with resistors as later explained. A suitable push-button switch such as indicated at 246 is also provided for manually starting and stopping the operation of the main motor 100 which constitutes the drive for the cam-shaft 115, see Fig. 1. In addition, push-button switches 247, shown in Fig. 1, are provided for manually stopping the operation of the individual motors 60 and 61. These various switches and the control circuits therefor are shown in the diagram of Fig. 15 and explained later.

Figure 14:
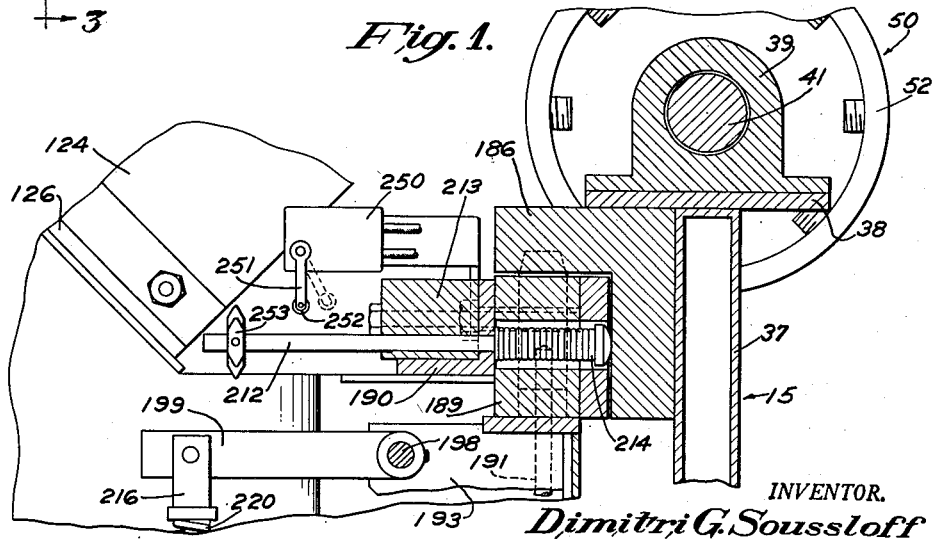
Fig. 14 is part-sectional view of the locking means for the spindle-carrying arms showing the electrical switch in the motor circuit and the actuating means therefor in its relation to the lock.

For stopping the individual motors 60 and 61 to automatically arrest the drive to the winding spindles 40 and 41 so-called limit switches 250 are provided in the motor circuits with means for actuating them at the completion of winding each package; for example, as the respective winding spindle is moved away from the traversing means into doffing position. Conveniently, each switch 250 may be actuated by the movement of the plunger rod 212 which forces the arm 14 or 15 outwardly after the latch-bolts 185 have been withdrawn. As this device operates in the same way for each winding spindle it will be sufficient to describe the organization of the mechanism for only one. Referring to Figs. 3 and 14, the switch 250 is provided with a rockable arm 251 carrying a roller 252 at its lower end. The plunger rod 212 has fastened to its rearward end a trip-member 253 adapted to wipe across the lower end of the arm 251 to swing it towards the right, as viewed in Fig. 14, whereby to momentarily open the switch contacts as the member 253 rides under and beyond the roller 252 on the arm. The arm 251 is spring-operated to return it to first position after this action so as to close the switch 250, the method of functioning of the switch being explained later in connection with the electrical circuits illustrated in the diagram, Fig. 15. Thus it will be understood that when the plunger rod 212 is slid forwardly by the action of its spring 214 to force the spindle-carrying arm outwardly, as before explained the switch is actuated to interrupt the current to the motor which drives its respective winding spindle on the arm.

Figure 15:
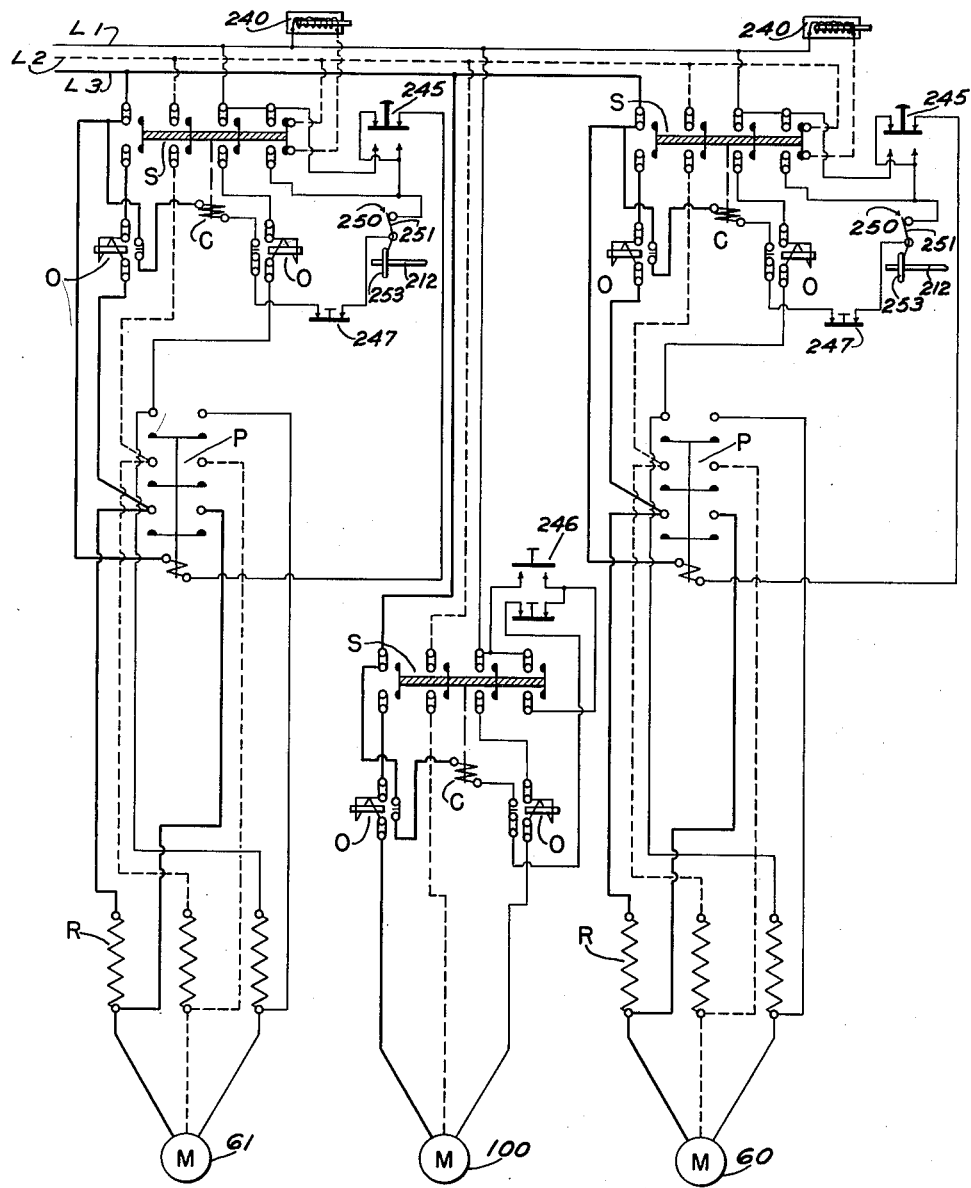
Fig. 15 is a diagram of the electrical circuits for controlling the automatic operation of the machine.

Referring to the wiring diagram in Fig. 15 of the drawings, the electrical circuits for the several motors are arranged as next described. Three-phase current is taken from the power line comprising the conductors L-1, L-2 and L-3 represented, respectively, by a light line, a dotted line, and a heavy line on the diagram. The circuit for the motor 100 which drives the cam-shaft 115 is comparatively simple as constituted by three conductors leading off from the power line and connected to a magnetic motor-starting switch, indicated generally by the reference character S. Cut into this circuit is the push-button switch 246 adapted for manual operation to selectively start or stop the motor 100. The magnetically-operated switch S is provided with a holding coil C energized by closing the switch 246 and overload coils O are also provided in the circuit to prevent burning out the motor windings. It will thus be apparent that the motor 100 may be operated continuously by closing the contacts of the switch 246 or its operation may be arrested by opening the contacts of this switch.

The electrical circuits to the motors 60 and 61 for driving the winding spindles 40 and 41 are somewhat more complicated but as the wiring is the same for both motors it will be sufficient to describe the connections for only one of them. Referring to Fig. 15, the brake-solenoid 240 is shown in the diagram as connected in the circuit with the conductors L-1 and L-2 and the three conductors are connected to the terminals of a magnetic motor starting switch S similar to that employed in the circuit for the motor 100. The switch S is operated by a holding coil C with two overload coils O being also provided in the circuit for this switch. Also in the circuit to the magnetic starter S is the push-button stop switch 247 and foot-switch 245, both previously referred to. In addition to these last mentioned switches the circuit to the magnetic starter S includes the automatically-controlled switch 250 which is actuated by movement of the push-rod 212 as previously explained. From the magnetic starting switch S the circuit leads to a three-pole magnetic contactor designated P which is normally open; and thence the circuit leads to a plurality of resistors R which cooperate with the magnetic contactor S for starting the motors 60 and 61 at slow speed when the foot-switch 245 is held manually with its contacts closed. It will be noted from the diagram of Fig. 15 that there are two sets of conductors leading from the magnetic contactor P, one set being connected through the resistors R to the motor 60 or 61 and the other set leading directly to the motor without intervention therein of the resistors R. Through this arrangement of the circuits the driving motors 60 and 61 for the winding spindles 40 and 41 may be started slowly by the use of the foot-switch 245 to cause the current to flow to each motor through the resistors R. On the other hand, after either motor 60 or 61 has been started the foot-switch 245 may be released to open the contacts and thereby the current will flow through the conductors leading directly to the respective motor to continue its operation at high speed as required for the continuous operation of the machine. The method of operation of the complete machine is explained as follows:

To start the operation of the machine shell-like package-containers or tubes T are placed on the package-holders 50 and 51 and secured rotatively therewith by suitable means, not herein shown or described. The strand of yarn $y$ or other material issuing from a spinneret or other supplying device is drawn downwardly and its end attached to one of the tubes T, for example, the tube on the package-holder 50. After the strand has been threaded through the eye 88 of the thread-guide 75 the arms 14 and 15 may be carried into position to locate their spindles in winding relationship adjacent the traverse mechanism and the machine is then ready for starting. The motor 100 may be started by closing the contacts of the push-button switch 246 to cause it to drive the shaft 115; and the feed-cams 106 and 107. Simultaneously with the start of the motor 100 the motor 60 may be started by pressing down on the foot-switch 245 to close the circuit through the magnetic starter switch S, the magnetic contactor R, and the resistors R. The motor 60 will therefore start to drive the spindle 40 at relatively slow speed so that as the strand is taken up by winding on the tube T it will not encounter any rapid pull or jerk to break the material. After the strand has been wound a few turns around the tube T carried by the package-holder 50 the foot-switch 245 may be released, thereby causing the current to flow directly from the magnetic contactor P to the motor without intervention of the resistors R whereby to drive the winding spindle at high speed. It is to be understood that the brake-solenoid 240 is normally energized when the motor 60 or 61 is at rest to maintain the brake applied. When, however, the foot-switch 245 is closed the current will pass to the holding coil to close the contacts in the magnetic starter S and simultaneously open the contacts in the circuit leading to the brake-solenoid 240. Therefore, the brake for the motor is released immediately the current is switched to start the motor.

Figure 6:
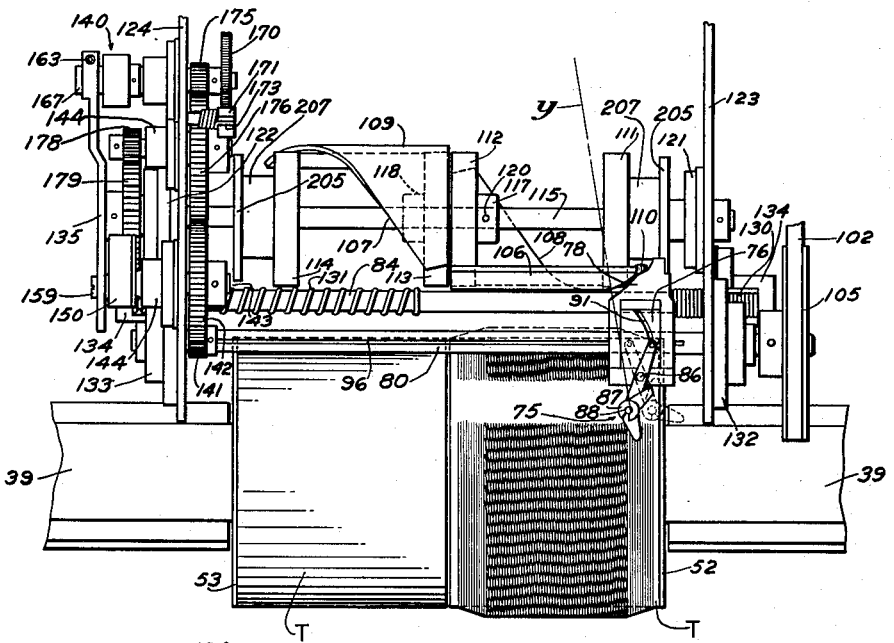
Fig. 6 is a further detailed plan view of the traversing means and traverse-shifting means shown in connection with the axially-alined holders for the different packages and illustrating the package on the right-hand spindle as completed.

As the spindle 40 and its package-holder 50 start to rotate the strand-guide 75 is oscillated to traverse the yarn with a relatively short extent of traverse, it being assumed that the guide is in starting position at the left-hand end of the tube T on the right-hand package-holder 50 at this juncture. As the strand-guide 75 is oscillated by the rotation of the cam 76, which turns with the shaft 80 driven from the motor 100, the feed-cam 106 comes into play to feed the guide towards the right axially of the winding spindle 40; it being assumed that the roller 110 which feeds the cross-head 74 laterally is engaged with the helical edge 108 of the cam 106. The feed of the cross-head 74 is continued clear to the right-hand end of the package-holder 50 as indicated in Fig. 6 of the drawings with the strand-guide 75 continuously oscillated rapidly during the feed so that the yarn or other material is distributed in short overlapping layers, similar to a weft or filling wind for shuttler bobbins. Consequently, the package is built up with a multiplicity of helical turns extending back and forth longitudinally of its axis to form the mass with a cylindrical periphery through most of its length terminating in tapered portions at the ends of the tube T. It is generally considered that this type of package is best adapted for further processing of the material, that is without any great mass of yarn on the container or tube T. In other cases, however, the machine may be adapted for winding the material in packages of greater bulk.

After the cross-head 74 has been fed to its extreme position at the right as shown in Fig. 6 the roller 110 will ride off from the end of the edge 108 of the cam 106 as the latter continues its rotation. Immediately the roller becomes disengaged from the end of the edge 108 of the cam 106 the spring 130 will come into play, it being understood that this spring has been compressed and energized by the sliding motion of the cross-head 74 along the rod 84. Therefore, the reaction of the spring 130 will cause the cross-head 74 to be shifted in the opposite direction from its initial feeding motion, that is, towards the left as viewed in Fig. 6, and at a rapid rate to cause the roller 110 to be carried into position for engagement with the rim or edge 109 of the opposite feed-cam 107. The force of the spring 130 communicated to the cross-head 74 engenders sufficient momentum to cause the cross-head to slide some distance past the inner end of the package-holder 51; that is, beyond mid-position between the ends of the two winding spindles. This additional motion of the cross-head will cause the strand y to be laid with a few turns about the tube T on the package-holder 51 as shown in Fig. 7. The spring 131 at this end of the rod or shaft 84 will yield somewhat, but immediately the momentum of the cross-head is overcome this spring will expand to carry the cross-head back to a starting position adjacent the right-hand end of the tube T on the package-holder 51, see Fig. 7. Now, as the strand-guide 75 continues to oscillate the cam 107 will act through the roller 110 to feed the cross-head 74 toward the left thereby continuing the winding on the tube T until another package is completed in the same form as previously described. In this way the winding is maintained continuous with the strand-guide 74 traversing the yarn first on one tube or container T and then being shifted to wind on the other tube to produce a series of packages alternately, first on one tube and then on the other tube, as long as the strand material is delivered to the machine.

It has been stated that the winding operation is arrested at each winding spindle upon the completion of each package, the stopping of the winding spindle for this purpose being accomplished automatically through the operation of the limit switch 250 actuated by the plunger-rod 212 in the manner as previously explained. The arrestment of rotation of each winding spindle occurs as the spindle swings outwardly with its arm 14 or 15 pivoting on its mounting below, the release of the arm 14 or 15 being effected by the withdrawal of its latch-bolts 185. The latch-bolts 185, as before explained, are withdrawn by the pair of levers 197 upon release of the connected lever 199, see Fig. 4. The release of the lever 199 occurs when the respective cam 205 at the end of the cam-shaft 115 has turned sufficiently to cause its eccentric portion to depress the horizontal arm of the lever 290 and disengage its vertical arm from the end of the lever 199 as shown most clearly in Fig. 4. It will be understood that the cam 205 is turned to this position at the end of the feeding stroke of the cross-head 74 upon completion of the winding of the right-hand package on the holder 50 as just above explained. Immediately the lever 199 is released the spring 220, see Fig. 3, will rock it upwardly to depress the levers 197 which, acting through the collars 196, will withdraw the latch-bolts 185 as shown in Fig. 4. Immediately this unlocking of the arm 14 occurs the plunger-rod 112 will act against the side of the arm 14 to initiate its outward swinging motion, whereafter gravity will cause the arm to swing downward into the position shown in Fig. 3; it being understood that in this view it is the arm 15 which is shown released for convenience in illustrating the other arm 14 as locked in winding position. The winding spindle and its package-holder 50 is thus automatically carried into position for convenient doffing of the finished package therefrom by merely sliding its tube off from the end of the holder. In the meantime the winding is continued on the tube carried by the opposite holder 51 to build another package.

After the completed package has been doffed from the holder 50 and a new tube T placed thereon it is necessary to manually reset the locking means. For this purpose the foot-lever 222 is depressed to rock the lever 199 downwardly and thereby compress the spring 220 so that the springs 195 may be released to force the latch-bolts 185 upwardly. As the lever 199 is drawn downwardly the detent-lever 200 will be rocked by its spring 210 to carry its vertical arm into engagement with the end of the lever 199. Then when the arm 14 is swung back to return the holder 50 into winding position its plate 233 will slide across the ends of the latch-bolts 185 to depress them, whereafter they will slide upwardly under the force of the springs 195 to engage their ends in the notches 187 to hold the winding spindles in place for the next winding operation.

The motor 60 constituting the drive for the spindle 40 may then be started again in the manner as first explained, but it is usually unnecessary to continue the slow starting action for an extended interval. That is to say, when both winding spindles are being driven the package-holders 50 and 51 will be revolved at the same rate of speed so that when the winding operation is shifted from one holder to the other holder no sudden pull or jerk is applied to the strand delivering to the winding. As each winding spindle is started to rotate by starting its respective motor the brake-solenoid 240 is de-energized to release the brake due to the opening of the circuit thereto as the contacts of the magnetic starter S are closed, the method of operation of this last-designated device being familiar to those versed in the electrical art.

Figure 16:
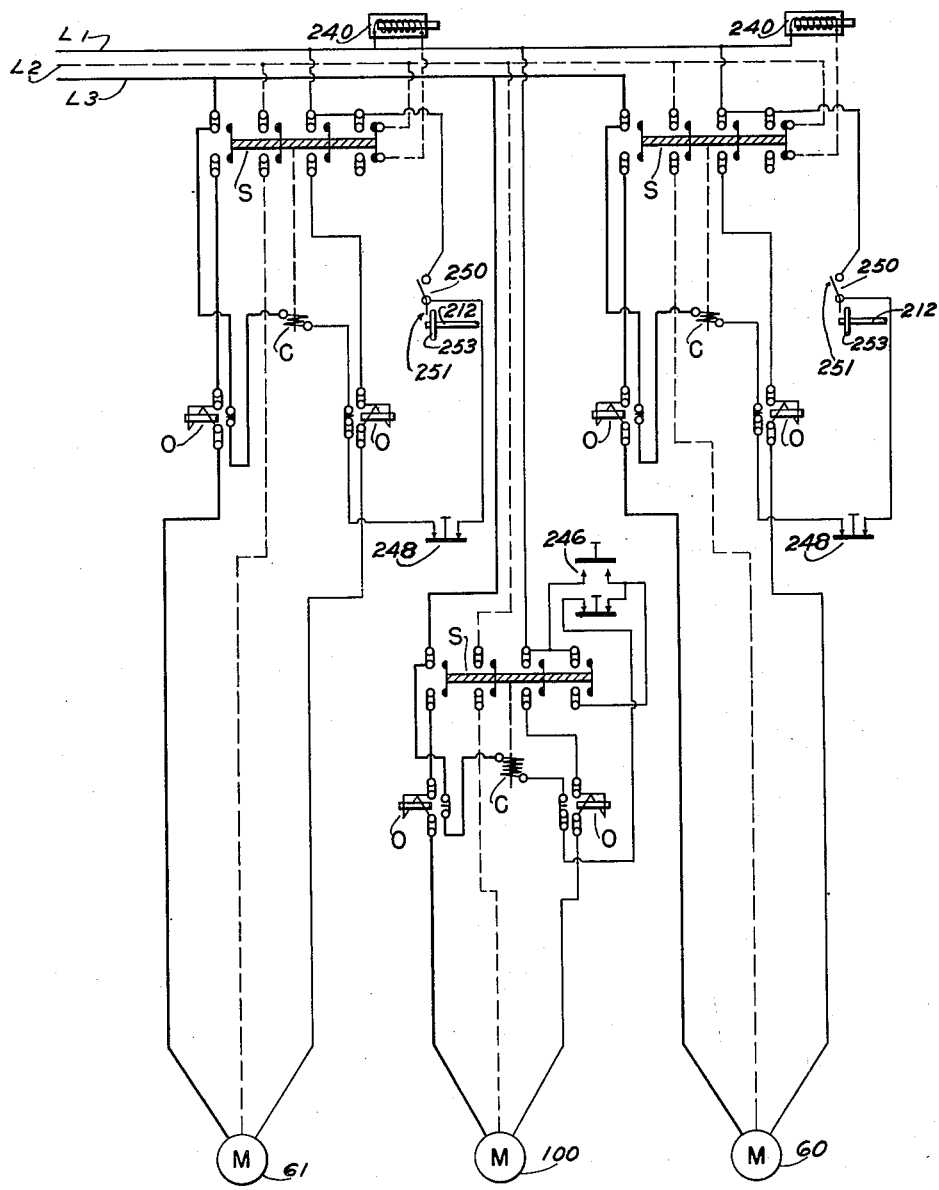
Fig. 16 is a diagram of the electrical circuits for an alternative method of control.

For some purposes, for example, if the machine is adapted for winding on package-holders of relatively small diameter or with a different method for delivering the yarn, the winding spindles may be started automatically without the use of the slow-starting device. Fig. 16 of the drawings shows an alternative arrangement of the circuits for starting the spindle-driving motors 60 and 61 automatically as the spindles are carried into cooperative relation to the traversing mechanism of the machine. With this latter system of control the so-called limit-switch is of slightly different construction. For example, the switch 250 shown on the diagram of Fig. 16 may be of a usual type with its arm movable in one direction for opening the contacts and in the opposite direction for closing them. The circuit from the power line has the same arrangement as regards the brake-solenoid 240, the magnetic-motor starting switch S, the overload coils O, and the manually-operable starting and stopping switch 248, which latter is normally maintained closed throughout the continuous operation of the machine. The switch 248, which may be of push-button type, is provided in the circuit to each motor 60 or 61 so that the respective spindle driven thereby may be stopped manually should occasion require without disturbing the automatic stopping means. The circuit from the magnetic motor starter S is connected directly to the motor 60 or 61 with the resistors eliminated, it being noted that the circuits and arrangement of switches are the same for both motors 60 and 61; and also the circuit to the main motor 100 for driving the shaft 80 and the connected cam-shaft 115 is the same as previously described. With this last described type of control for each spindle-driving motor the trip-member 253 on the plunger-rod 212 wipes across the switch-arm 251 to open the switch contacts when the plunger is projected outwardly to propel the spindle-carrying arm and initiate its movement into doffing position. On the other hand, when the arm carrying the winding spindle is swung back to locate the spindle in operative position in relation to the traversing means the trip-member 253 will move the switch-arm 251 in the opposite direction to close the switch contacts and release the current to the motor 60 or 61 for driving the respective spindle. In this way the opening or closing of the switch 250 for controlling the drive to either winding spindle is accomplished automatically. When it is desired to start the rotation of the spindles slowly, for example, after piecing up the ends should the yarn be broken or in commencing to wind thereon, then the control means explained in connection with the diagram of Fig. 15 may be employed.

It should be explained that as the transfer of the strand-guide 75 from one package-holder T to the other is very rapid the few coils of yarn shown in Fig. 7 as deposited on the bare tube T are applied before the completed package is released. Then when the finished package is swung out of winding position by the automatic release of the latch-bolts 185, the length of yarn extending between the two tubes T will ordinarily be broken. However, should the yarn be relatively coarse and strong, severing means may be provided to cut the yarn between the two tubes T.

It will be observed from the foregoing description that the present invention provides a highly-automatic machine for winding continuously-delivered strand material into a series of packages without interrupting the delivery. While the machine is herein shown and described as embodied in a preferred form of construction, it is to be understood that modifications may be made therein without departing from the spirit or scope of the invention. Therefore, without limiting myself in this respect, I claim:

1. In a winding machine, a plurality of winding spindles, driving means for independently rotating each spindle, yarn-guiding means for successively traversing the yarn relatively of one spindle and then relatively of another spindle, means for continuously reciprocating the yarn-guiding means, separate cams for feeding the yarn-guiding means longitudinally of the spindles, resiliently-actuated means for transferring the yarn-guiding means from one cam to another cam, and means for automatically arresting the driving means for each spindle when the yarn-guiding means is transferred to another spindle.

2. In a winding machine, a plurality of winding spindles arranged in axial alinement, means carried by said spindles for receiving a strand wound thereon, strand-guiding means, a plurality of cams for successively traversing said strand-guiding means relatively of the strand-receiving means on each spindle, resiliently-operated means for transferring said strand-guiding means from one cam to another cam to shift said strand-guiding means from one strand-receiving means to another of said strand-receiving means, and means actuated automatically upon completion of the winding on one strand-receiving means to cause actuation of the transferring means.

3. In a winding machine, a plurality of winding spindles, package-holders on said spindles for receiving yarn wound thereon, means for latching said package-holders in winding position, means for rotating said spindles, means for traversing the yarn axially of each package-holder, means for transferring the traversing means from one package-holder to another package-holder to commence winding thereon, and automatically-operated power-driven means for releasing the latching means for one package-holder to adapt it to be moved into position for doffing the wound package as the traversing means starts to wind the yarn on another package-holder.

4. In a winding machine, a pair of winding spindles each carrying a package-holder, means for independently rotating said winding spindles, a strand-guide for traversing yarn longitudinally of each package-holder, means for oscillating said strand-guide, means operated automatically to transfer the strand-guide from one package-holder to another package-holder upon completion of the winding on each package-holder, means for holding each package-holder in position for winding, and means actuated from the driving means of the machine for automatically releasing said holding means and to effect displacement of each package-holder upon completion of the winding thereon to carry it into position for doffing the wound package.

5. In a winding machine, a pair of winding spindles each carrying a package-holder, means for traversing yarn longitudinally of said package-holders, means for mounting said package-holders to move away from the yarn-traversing means, means for holding said package-holders severally in position to cooperate with the yarn-traversing means, means for transferring the yarn-traversing means from one package-holder to the other package-holder upon completion of the winding of each package, and positively-actuated means for releasing the holding means to cause each package-holder to move away from the yarn-traversing means when said traversing means is in cooperation with the other package-holder.

6. In a winding machine, a pair of rotary package-holders, means for rockably supporting said package-holders in winding position, a strand-guide for traversing yarn longitudinally of the package-holders, means for locking each package-holder in cooperative relation to the strand-guide, means for shifting the strand-guide to transfer it from cooperative relation to one package-holder into cooperative relation to the other package-holder, and mechanically-actuated means for releasing the locking means for one package-holder as the winding is completed thereon to adapt it to move away from the strand-guide after the latter has been transferred into cooperative relation to the other package-holder.

7. In a winding machine, a strand-guide, means for oscillating said strand-guide with a relatively short extent of throw, a pair of rotary winding spindles, means for independently supporting said spindles in cooperative relation to the strand-guide, a package-holder carried by each spindle, separate cam means to feed the strand-guide longitudinally of each package-holder, means to oscillate the strand-guide during the feeding movement thereof to deposit the strand on the package-holder in short traverses to build a package thereon, and resilient means operative after said strand-guide has been fed from the end of one package-holder to its opposite end to transfer said guide into position opposite the other package-holder to continue the winding thereon.

8. In a winding machine, a pair of rotary winding spindles, means for supporting said winding spindles in coaxial relationship, package-holders rotatable by said spindles in axially-alined relationship, a guide for depositing strand-material on said package-holders, means for oscillating said guide with a length of throw less than the length of each package-holder, separate cams for progressively feeding the strand-guide from one end of each package-holder to its opposite end during its oscillation, and resilient means operated automatically to transfer the strand-guide from one guide-feeding cam to the other guide-feeding cam after it has been fed throughout substantially the length of each package-holder.

9. In a winding machine, a pair of winding spindles, means for movably supporting said winding spindles, means for independently rotating said winding spindles, package-holders carried by said spindles, means for maintaining the spindles in coaxial relationship with the package-holders in alinement, a guide for distributing strand-material on each of the package-holders in succession, means for oscillating said strand-guide with a relatively short extent of traverse less than the length of each package-holder, separate cams for feeding the strand-guide from one end of each package-holder to its opposite end during its oscillation, and resilient means operated automatically at the end of each feeding movement to shift the strand-guide from one cam to the other cam to carry it into cooperative relation to the opposite package-holder to distribute the strand thereon during its continuous oscillation in relation thereto.

10. In a winding machine, a pair of winding spindles carrying package-holders, means for supporting said winding spindles in coaxial relationship with their package-holders in alinement, a strand-guide movable in a path opposite said package-holders, means for oscillating said strand-guide to distribute yarn on each package-holder in relatively short traverses less than the length of the package-holder, separate cams for feeding said strand-guide from one end of each package-holder to its opposite end during its oscillation to build a package in short overlapping layers, and resilient means released automatically at the end of each feeding motion of the strand-guide to transfer it from one cam to the other cam into position for cooperation with the opposite package-holder.

11. In a winding machine, a pair of rotatable package-holders, means for independently rotating said package-holders, strand-traversing means movable in a path opposite said package-holders, means to oscillate said strand-traversing means, separate cams for continuously feeding said traversing means longitudinally of each package-holder during its oscillation to deposit the strand in relatively short traverses thereon, and means released automatically at the end of each feeding motion to shift the traversing means from one cam to the opposite cam to transfer the strand-traversing means from the end of one package-holder into position for depositing the strand on the opposite package-holder.

12. In a winding machine, a pair of rotary package-holders arranged in axial alinement, means for independently rotating said package-holders, means for traversing yarn on each package-holder with a relatively short extent of traverse, means to oscillate said yarn-traversing means, separate cams for feeding the traversing means from one end of each package-holder to the opposite end thereof, and resiliently-actuated means for transferring the traversing means from one cam to the other cam to displace it from the end of one package-holder into position for traversing the yarn on the opposite package-holder and feeding it from end to end thereof.

13. In a winding machine, a pair of rotatable package-holders, means for rotating said package-holders, a single oscillating traversing means for depositing yarn on each package-holder with a relatively short extent of traverse less than the length of the package, a pair of axially-alined cams for feeding said traversing means from one end to the opposite end of each package-holder during the traverse of the yarn thereon, resiliently-acting means for transferring the traversing means from one cam to the other cam to displace it from the end of one package-holder into cooperative relation to the opposite package-holder, and means for automatically actuating said transferring means upon the completion of the winding of each package.

14. In a winding machine, a pair of rotatable package-holders, traversing means for distributing yarn on each of said holders in relatively short traverses less than the length of the holder, a pair of cams for feeding the traversing means longitudinally of each package-holder to build a package thereon composed of relatively short overlapping layers of yarn, and spring means for shifting said traversing means from one cam to the other cam upon the completion of each package wound on a holder to continuously produce a plurality of packages one after another in sequence on the different holders.

15. In a winding machine, a pair of rotatable package-holders, means for rotating said package-holders, yarn-traversing means movable in a path opposite each package-holder, a separate cam for each package-holder, means engageable with each cam to feed the traversing means longitudinally of its respective package-holder, resilient means for shifting said traversing means from one cam to the opposite cam to commence the winding of a package on one holder after the package has been completed on the other holder, and means for energizing said resilient means to actuate said shifting means automatically at the completion of each package.

16. In a winding machine, a pair of rotatable package-holders arranged in axial alinement, yarn-traversing means movable in a path opposite said package-holders, a cam opposite each package-holder, means for alternately connecting said cams to the traversing means to feed said traversing means longitudinally of its respective package-holder to build a package thereon, resilient means for shifting the connecting means from one cam to the other cam, and means operative at the completion of each package to energize the resilient means to cause transfer of the traversing means from one package-holder to the other package-holder.

17. In a winding machine, a pair of rotatable package-holders, means to rotate said package-holders, traversing means for depositing yarn on the package-holders, a pair of cams for feeding the traversing means longitudinally of said package-holders, means for connecting the traversing means with each cam, and resiliently acting means for disconnecting said traversing means from one cam and connecting it to the opposite cam to cause the traversing means to distribute the yarn first on one package-holder and then on the other package-holder to wind a series of packages one after another in sequence.

18. In a winding machine, a pair of rotatable pacakage-holders, means to rotate said package-holders, traversing means movable in a path opposite said package-holders, a pair of cams of opposite pitch each having a helical face extending through 180° of a circumference, means connected to the traversing means and alternately engageable with the helical faces of said cams, and resiliently acting means for automatically shifting said engaging means to cause it to ride off from the face of one cam and engage the face of the other cam to feed the traversing means longitudinally of the respective package-holders to continuously wind packages one after another in sequence.

19. In a winding machine, a pair of rotatable package-holders disposed in axial alinement, a pair of cams arranged opposite said package-holders, each cam being of semi-cylindrical form with a helical face extending 180° of a circumference, traversing means movable in a path parallel with the axes of the package-holders, a cam-follower connected with said traversing means and engageable with the helical face of each cam, and resiliently acting means for automatically shifting said traversing means to cause its follower to ride off from the face of one cam and engage with the helical face of the other cam to cause the traversing means to feed longitudinally of each package-holder first relatively to one and then relatively to the other in sequence.

20. In a winding machine, a pair of rotatable package-holders, means to independently rotate each package-holder, traversing means for distributing yarn on said package-holders, means for actuating the traversing means in cooperative relation to each package-holder, means to transfer the traversing means alternately from one package-holder to the other package-holder in sequence, means operated from the drive of the machine for automatically displacing each package-holder from the traversing means after completion of the winding thereon, means for arresting the rotation of each package-holder as it is displaced from the traversing means, and means operated automatically to start the rotation of each package-holder as it is carried into cooperative relation to the traversing means.

21. In a winding machine, the combination of a plurality of package-holders, driving means for individually rotating said package-holders, a single traversing means for depositing yarn on each package-holder, means for transferring the traversing means from one package-holder to another package-holder in sequence, means actuated from the driving means for automatically arresting the rotation of each package-holder upon the transfer of the traversing means therefrom, automatically-operated means for displacing each package-holder away from the traversing means, and means for automatically starting the rotation of each package-holder upon its return into cooperative relation to the traversing means.

22. In a winding machine, a plurality of rotatable package-holders, separate driving means for individually rotating said package-holders, means for traversing yarn longitudinally of each package-holder, means for transferring the traversing means from one package-holder to another package-holder in sequence to wind a package first on one holder and then on another holder, means for mounting the package-holders to move toward and away from the traversing means, means to lock the package-holders severally in cooperative relation to the traversing means, means operated from the driving means for automatically releasing said locking means upon completion of the winding on each package-holder, and means for automatically restarting the rotation of each package-holder as it is locked in cooperative relation to the traversing means.

23. In a winding machine, a pair of rotatable package-holders arranged in axial alinement, traversing means for depositing yarn on each package-holder, means for transferring the traversing means from one package-holder to the other package-holder to continuously wind a series of packages in sequence, means for locking said package-holders individually in cooperative relation to the traversing means, cam-operated means for automatically releasing the respective locking means upon the completion of a package wound on each holder, means to arrest the rotation of each package-holder upon release of its respective locking means, means for automatically re-engaging the locking means as each package-holder is carried into cooperative relation to the traversing means, and means for automatically starting the rotation of each package-holder as it is locked in position for cooperation with the traversing means.

24. In a winding machine, a pair of rotatable package-holders, means for independently rotating said package-holders, strand-traversing means for depositing yarn on said package-holders, a pair of cams for feeding said traversing means longitudinally of said package-holders, means for transferring said traversing means from one cam to the other cam upon the completion of each package wound on a package-holder, means to lock said package-holders in cooperative relation to said traversing means, and means operated synchronizingly with the rotation of each cam to cause release of the locking means for each package-holder when the traversing means is transferred from one cam to the other cam.

25. In a winding machine, a pair of movably mounted package-holders, means for independently rotating said package-holders, strand-traversing means for depositing yarn on said package-holders, means for locking each package-holder in cooperative relation to said traversing means, a pair of cams for feeding the traversing means longitudinally of the package-holders, a shaft for rotating said cams, automatically-operated means for transferring the traversing means from one cam to the other cam at the completion of winding a package on each package-holder, and separate cams on said cam-shaft for releasing the locking means when the traversing means is transferred from one cam to the other cam to permit each package-holder to be moved away from the traversing means for doffing the package therefrom.

26. In a winding machine, a pair of rotatable package-holders, traversing means for distributing yarn on each of said holders, a pair of cams for feeding the traversing means longitudinally of the different package-holders, means for mounting the package-holders to move away from the traversing means, locking means for retaining the package-holders in cooperative relation to the traversing means, continuously-operated time-controlled means for releasing the locking means at the completion of winding a package on each holder, and means for moving each package-holder into position for doffing the completed package therefrom after the release of the locking means therefor.

27. In a winding machine, a pair of rotatable package-holders, traversing means for distributing yarn on said package-holders, means for feeding said traversing means longitudinally of each package-holder, means for transferring the traversing means from one package-holder to the other package-holder upon completion of each package wound on a holder, mechanically-actuated means for moving each package-holder away from the traversing means upon completion of the winding of the package thereon, and automatically-operated means for starting the rotation of each package-holder at slow speed when it is carried back into cooperative relation to the traversing means.

28. In a winding machine, a plurality of rotary package-holders, traversing means for depositing yarn on said package-holders, means for transferring the traversing means from one package-holder to another package-holder to commence winding thereon, independent means for movably supporting each package-holder, locking means for holding each package-holder in cooperative relation to the traversing means, detent-means for holding said locking means engaged, and means for automatically actuating said detent-means to release the locking means upon the completion of winding a package on each holder so that the latter may be moved away from the traversing means for doffing the package therefrom.

29. In a winding machine, a plurality of rotary package-holders, traversing means for depositing yarn on said package-holders, means for transferring the traversing means from one package-holder to another package-holder to commence winding thereon, independent means for movably supporting each package-holder, locking means for holding each package in cooperative relation to the traversing means, detent-means for holding said locking means engaged, means for actuating said detent-means to release the locking means upon the completion of winding a package on each holder so that the latter may be moved away from the traversing means for doffing the package therefrom, and means for resetting the detent-means when each package-holder is carried back into cooperative relation to the traversing means.

DIMITRI G. SOUSSLOFF.

References Cited in the file of this patent

UNITED STATES PATENTS

| Number | Name | Date |
| --- | --- | --- |
| 1,393,286 | Hosford | Oct. 11, 1921 |
| 1,846,894 | Morgan | Feb. 23, 1932 |
| 2,205,384 | Abbott | June 25, 1940 |
| 2,267,899 | Dersen | Dec. 30, 1941 |
| 2,296,339 | Daniels | Sept. 22, 1942 |
| 2,323,677 | Reh | July 6, 1943 |
| 2,336,574 | Selvig | Dec. 14, 1943 |
| 2,424,021 | Cook | July 15, 1947 |
| 2,508,150 | Fennell | May 16, 1950 |
| 2,524,623 | Columbu | Oct. 3, 1950 |

FOREIGN PATENTS

| Number | Country | Date |
| --- | --- | --- |
| 12,331 | Great Britain | Sept. 12, 1887 |
| 384,414 | Great Britain | Dec. 8, 1932 |
| 500,135 | Germany | June 18, 1930 |